UNITED STATES PATENT OFFICE.

CHARLES E. ACKER, OF NIAGARA FALLS, NEW YORK.

PROCESS OF DETINNING.

No. 862,860.  Specification of Letters Patent.  Patented Aug. 6, 1907.

Application filed March 27, 1907. Serial No. 364,856.

*To all whom it may concern:*

Be it known that I, CHARLES E. ACKER, a citizen of the United States, residing at Niagara Falls, in the county of Niagara and State of New York, have invented certain new and useful Improvements in Processes of Detinning, of which the following is a specification.

This invention relates to the recovery of tin from tin-bearing materials and especially to the detinning of tin-scrap.

According to the present process, the tin-scrap is partially submerged in an anhydrous liquid capable of directly dissolving or reacting on the tin and of evolving a vapor or gas which will react on the unsubmerged portions of the scrap. Liquid reagents which may be employed are solutions of chlorin or bromin in carbon tetrachlorid or stannic chlorid, or a solution of anhydrous hydrogen chlorid in benzol, or toluol. The solution is preferably heated to furnish an atmosphere containing a considerable percentage of chlorin, bromin or hydrogen chlorid.

In carrying out the process, the tin-scrap, loose or preferably compressed into bundles, is introduced into a suitable reaction-vessel, for example a steel cylinder. The anhydrous chlorin solution or other liquid reagent occupies the lower part of the vessel, a portion of the tin-scrap being submerged in the liquid and another portion occupying the upper part of the vessel. The liquid may be warmed, for example by hot water or steam supplied to a jacket surrounding the lower part of the vessel, and the heat may be sufficient to not only evolve chlorin, bromin or hydrogen chlorid from the liquid but also to vaporize a portion of the liquid, the resulting gaseous reagent then consisting for example of a mixture of chlorin and the vapor of carbon tetrachlorid or stannic chlorid. If the space in the vessel above the liquid is initially filled with air, this air will also act as an inert diluent of the gaseous reagent. In the treatment of compressed scrap, it is preferred to initially exhaust the air from the vessel before applying heat to the liquid. During the process, the pressure of the gas-mixture over the liquid usually rises to a point considerably above normal atmospheric pressure, forcing both the gaseous and liquid reagents into all the interstices of the scrap. In some cases, an additional supply of chlorin may be pumped into the receptacle during the treatment. After the scrap is completely detinned, the gases may be delivered to a condenser and the liquid reagent and dissolved product drawn off into a receiver.

I claim:

1. The process of recovering tin, which consists in simultaneously subjecting different portions of a body of tin-bearing material to the action of a liquid detinning reagent and an atmosphere containing a gaseous detinning reagent evolved from said liquid.

2. The process of recovering tin, which consists in simultaneously subjecting different portions of a body of tin-bearing material to the action of a liquid detinning reagent and an atmosphere containing a gaseous detinning reagent evolved from said liquid, and heating said liquid to assist the evolution of said gaseous reagent.

3. The process of detinning, which consists in simultaneously subjecting different portions of a body of compressed tin-scrap to the action of a liquid detinning reagent and an atmosphere containing a gaseous detinning reagent evolved from said liquid, and varying the pressure in the reaction vessel during the detinning.

4. The process of detinning, which consists in simultaneously subjecting different portions of a body of compressed tin-scrap to the action of a liquid detinning reagent and an atmosphere containing a gaseous detinning reagent evolved from said liquid, and increasing the pressure in the reaction vessel during the detinning.

5. The process of detinning, which consists in simultaneously subjecting different portions of a body of compressed tin scrap to the action of a liquid detinning reagent and an atmosphere containing a gaseous detinning reagent evolved from said liquid, heating said liquid to assist the evolution of said gaseous reagent, and varying the pressure in the reaction vessel during the detinning.

6. The process of detinning, which consists in simultaneously subjecting different portions of a body of compressed tin-scrap to the action of a liquid detinning reagent and an atmosphere containing a gaseous detinning reagent evolved from said liquid, heating said liquid to assist the evolution of said gaseous reagent, and increasing the pressure in the reaction vessel during the detinning.

7. The process of detinning, which consists in simultaneously subjecting different portions of a body of tin-scrap to the action of an anhydrous liquid containing dissolved chlorin and an atmosphere containing a gaseous detinning reagent evolved from said liquid.

8. The process of detinning, which consists in simultaneously subjecting different portions of a body of tin-scrap to the action of an anhydrous liquid containing dissolved chlorin and an atmosphere containing a gaseous detinning reagent evolved from said liquid, and heating said liquid to assist the evolution of said gaseous reagent.

9. The process of detinning, which consists in simultaneously subjecting different portions of a body of compressed tin-scrap to the action of an anhydrous liquid containing dissolved chlorin and an atmosphere containing a gaseous detinning reagent evolved from said liquid, and varying the pressure in the reaction vessel during the detinning.

10. The process of detinning, which consists in simultaneously subjecting different portions of a body of compressed tin-scrap to the action of an anhydrous liquid containing dissolved chlorin and an atmosphere containing a gaseous detinning reagent evolved from said liquid, and increasing the pressure in the reaction vessel during the detinning.

11. The process of detinning, which consists in simultaneously subjecting different portions of a body of compressed tin-scrap to the action of an anhydrous liquid containing dissolved chlorin and an atmosphere containing a gaseous detinning reagent evolved from said liquid, heating said liquid to assist the evolution of said gaseous reagent, and varying the pressure in the reaction vessel during the detinning.

12. The process of detinning, which consists in simultaneously subjecting different portions of a body of compressed tin-scrap to the action of an anhydrous liquid containing dissolved chlorin and an atmosphere containing a gaseous detinning reagent evolved from said liquid, heating said liquid to assist the evolution of said gaseous reagent, and increasing the pressure in the reaction vessel during the detinning.

In testimony whereof, I affix my signature in presence of two witnesses.

CHARLES E. ACKER.

Witnesses:
EUGENE A. BYRNES,
C. W. FOWLER.